(12) United States Patent
Unger et al.

(10) Patent No.: US 9,865,077 B2
(45) Date of Patent: Jan. 9, 2018

(54) REDUNDANT PIXEL MITIGATION

(71) Applicant: Microsoft Technology Licensing, LLC, Redmond, WA (US)

(72) Inventors: Markus Unger, Graz (AT); Konrad Karner, Raaba (AT); Blaise Aguera y Arcas, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/944,916

(22) Filed: Nov. 18, 2015

(65) Prior Publication Data

US 2016/0071306 A1 Mar. 10, 2016

Related U.S. Application Data

(63) Continuation of application No. 13/729,392, filed on Dec. 28, 2012, now Pat. No. 9,214,138.

(51) Int. Cl.
*G06T 15/04* (2011.01)
*G06T 9/00* (2006.01)
(Continued)

(52) U.S. Cl.
CPC ............... *G06T 15/04* (2013.01); *G06T 9/00* (2013.01); *G06T 9/001* (2013.01); *G06T 15/20* (2013.01);
(Continued)

(58) Field of Classification Search
CPC combination set(s) only.
See application file for complete search history.

(56) References Cited

U.S. PATENT DOCUMENTS 5,831,625 A * 11/1998 Rich ................. G06T 15/04
345/587
5,892,517 A * 4/1999 Rich ................. G06T 1/60
345/582

(Continued)

FOREIGN PATENT DOCUMENTS

CN 102025922 4/2011
CN 102800127 11/2012

OTHER PUBLICATIONS

U.S. Appl. No. 14/818,508, Amendment and Response filed Aug. 12, 2016, 12 pgs.
(Continued)

*Primary Examiner* — Wesner Sajous (57) ABSTRACT

Among other things, one or more techniques and/or systems are provided for mitigating redundant pixel texture contribution for texturing a geometry. That is, the geometry may represent a multidimensional surface of a scene, such as a city. The geometry may be textured using one or more texture images (e.g., an image comprising color values and/or depth values) depicting the scene from various view directions (e.g., a top-down view, an oblique view, etc.). Because more than one texture image may contribute to texturing a pixel of the geometry (e.g., due to overlapping views of the scene), redundant pixel texture contribution may arise. Accordingly, a redundant textured pixel within a texture image may be knocked out (e.g., in-painted) from the texture image to generate a modified texture image that may be relatively efficient to store and/or stream to a client due to enhanced compression of the modified texture image.

20 Claims, 7 Drawing Sheets

(51) Int. Cl.
*G06T 15/20* (2011.01)
*G06T 19/20* (2011.01)
*G09G 5/37* (2006.01)

(52) U.S. Cl.
CPC .............. *G06T 19/20* (2013.01); *G09G 5/37* (2013.01); *G06T 2200/04* (2013.01); *G06T 2215/08* (2013.01)

(56) References Cited

U.S. PATENT DOCUMENTS

| | | | |
|---|---|---|---|
| 6,184,888 B1* | 2/2001 | Yuasa | A61J 7/0481 345/419 |
| 6,433,789 B1 | 8/2002 | Rosman | |
| 6,606,089 B1 | 8/2003 | Margadant | |
| 6,693,964 B1 | 2/2004 | Zhang et al. | |
| 6,750,873 B1 | 6/2004 | Bernardini et al. | |
| 7,372,990 B2 | 5/2008 | Yamauchi et al. | |
| 7,453,455 B2 | 11/2008 | Park et al. | |
| 7,714,855 B2 | 5/2010 | Brabec et al. | |
| 7,956,870 B2 | 6/2011 | Snyder et al. | |
| 8,284,237 B2 | 10/2012 | Chen et al. | |
| 8,395,619 B1 | 3/2013 | Diard | |
| 9,135,742 B2 | 9/2015 | Unger et al. | |
| 9,214,138 B2 | 12/2015 | Unger et al. | |
| 2002/0080143 A1* | 6/2002 | Morgan | G06T 17/00 345/581 |
| 2004/0032980 A1 | 2/2004 | Harman | |
| 2004/0252892 A1 | 12/2004 | Yamauchi et al. | |
| 2006/0067573 A1 | 3/2006 | Parr et al. | |
| 2006/0284880 A1 | 12/2006 | Zhou et al. | |
| 2008/0247668 A1 | 10/2008 | Li | |
| 2009/0060273 A1 | 3/2009 | Stephan | |
| 2010/0289798 A1 | 11/2010 | Furuta et al. | |
| 2010/0290712 A1 | 11/2010 | Furuta | |
| 2010/0315412 A1 | 12/2010 | Sinha | |
| 2011/0115886 A1 | 5/2011 | Nguyen | |
| 2011/0267344 A1 | 11/2011 | Germann et al. | |
| 2012/0039528 A1* | 2/2012 | Lee | G06T 9/00 382/162 |
| 2012/0269457 A1 | 10/2012 | Vetro et al. | |
| 2012/0299920 A1 | 11/2012 | Coombe et al. | |
| 2012/0314040 A1 | 12/2012 | Kopf et al. | |
| 2013/0100132 A1 | 4/2013 | Katayama et al. | |
| 2013/0300740 A1 | 11/2013 | Snyder et al. | |
| 2014/0023293 A1 | 1/2014 | Liang | |
| 2014/0184596 A1 | 7/2014 | Unger et al. | |
| 2014/0267343 A1 | 9/2014 | Arcas et al. | |
| 2014/0267587 A1 | 9/2014 | Arcas et al. | |
| 2015/0339843 A1 | 11/2015 | Unger et al. | |

OTHER PUBLICATIONS

Bernandini, F. et al., "The 3D Model Acquisition Pipeline", Jun. 2002, Computer Graphics Forum, Wiley-Blackwell Publishing Ltd., vol. 21, No. 2, 24 pgs.
Chaurasia, Olga Sorkine et al., "Silhouette-Aware Warping for Image-Based Rendering", Jun. 27, 2011, Eurographics Symposium on Rendering, vol. 30, No. 4, 10 pgs.
Colombari, "Image-Based Techniques for View Synthesis and Video Editing", Apr. 11, 2006, reprinted from the Internet at: http://citeseerx.isl.psu.edu/viewdoc/summary?doi=10.1.1.102. 8303, 125 pgs.
Fehn, C. et al., "An Evolutionary and Optimised Aproach", Sep. 2002, Internet Citation, In Proceedings of International Broadcast Conference, 8 pgs.
Fitzgibbon, et al., "Image-Based Rendering Using Image-Based Priors", Retrieved at <<http://window.stanford.edu/courses/cs448a-06-winter/fitzgibbon-priors-iccv03.pdf>>, In International Journal of Computer Vision 63(2), Feb. 2005, pp. 11.
Fruh, Christian, and Avideh Zakhor. "Constructing 30 city models by merging aerial and ground views." Computer Graphics and Applications, IEEE 23.6 (2003): 52-61.
Goddard, "A Small Shadow Map Improvement", Aug. 23, 2012, reprinted from the Internet at: http://blog.gradientstudios.com/2012/08/23/shadow-map-improvement/, 6pgs.
Herrman, "Entire City Rendered in 3D Using Nothing but Flickr Photos", Sep. 18, 2009, reprinted from the Internet at: http://gizmodo.com/5362578/entire-city-rendered-in-3d-using-nothing-but-flickr-photos, 2 pgs.
Hornung, et al., "Interactive Pixel-Accurate Free Viewpoint Rendering from Images with Silhouette Aware Sampling", Retrieved at <<http://www.ahornung.net/files/pub/Hornung_CGF09.pdf>>, In Computer Graphics Forum, vol. 28, Issue 8, Jun. 9, 2009, pp. 13.
Magnor, Marcus Andreas, "Geometry-Adaptive Multi-View Coding Techniques for Image-Based Rendering", proceedings of a dissertation, retrieved Nov. 16, 2012, 144 pgs.
PCT Int. Search Report cited in PCT Application No. PCT/US2013/077737 dated May 20, 2014, 10 pgs.
PCT Reply Written Opinion cited in PCT Application No. PCT/US2013/077737 dated Mar. 12, 2015, 9 pgs.
PCT Written Opinion cited in PCT Application No. PCT/US2013/077737 dated Jan. 12, 2015, 5 pgs.
Po, Lai-Man et al., "A New Multidirectional Extrapolation Hole-Filling Method for Depth-Image-Based Rendering", 2011, 18th International Conference on Image Processing, 4 pgs.
Popescu, Voicu et al., "The Vacuum Buffer", Nov. 6, 2012, reprinted from the Internet at: https://www.google.com/search?sourceid=navclient&aq=&oq=The+Vacuum D+Buffer& ie=UTF8&rlz=1T4ADRA_enUS455US456& q=The+Vacuum+Buffer&gs_l=hp . . . 0.0.0.2890 . . . 0. 8 pgs.
Proceedings of a Dissertation, 2000, reprinted from the Internet at: http://www.google.com/url?sa=t&rct=j&q=&esrc=s&frm=1 & source=web&cd= 1 &ved=OCC8QFjAA&url=http%3A %2F%2 Fwww.mpi-inf. mpg. de% D2F-magnor%2Fpublications%2Fdiss. pdf&ei=4t3eUu-YEWbygGHIYCABA& usg=AFQjCNEyhlRKtzzTyT32nxwNAQA3uZz_uw&bvm=bv. 59568121,d.aWc, 144 pgs.
Pulli, et al., "View-based Rendering: Visualizing Real Objects from Scanned Range and Color Data", In Eurographics Rendering Workshop, Jun. 16, 1997, pp. 13.
Rumpler et al., "Rapid 3D City Model Approximation from Publicly Available Geographic Data Sources and Georeferenced Aerial Images", Feb. 2012 In the Proceedings 17th Computer Vision Winter Workshop, Mala Nedelja, Slovenia, 8 pgs.
Shum et al., "A Review of Image-based Rendering Techniques", Jun. 2000, Proceedings of Visual Communications and Image Processing (VCIP), reprinted from the Internet at: WWW.charlesneedham.com/pubs/68826/revieimage_rendering.pdf, 12 pgs.
Sinha et al., "Image-Based Rendering for Scenes with Reflections", 2012, In the proceedings of ACM Transactions on Graphics, reprinted from the Internet at: hllps://www.google.com/search?sourceid=navclient&aq=&oq=&ie=UTF-=8& rlz=1T4ADRA_enUS455US456& q=imagebased+rendering+for+scenes+with+reflections&gs_l=hp .. 0.411675.0.0.0.4765 . . . 0., 10 pgs.
Sun, Xiaoyong, "Scene Representation and View Synthesis in Image-Based Rendering", Dec. 2007, Proceedings of a Thesis submitted to the University of Ottawa, reprinted from the Internet, 178 pgs.
U.S. Appl. No. 13/729,392, Amendment and Response filed Apr. 6, 2015, 15 pgs.
U.S. Appl. No. 13/729,392, Notice of Allowance dated May 13, 2015, 5 pgs.
U.S. Appl. No. 13/729,392, Notice of Allowance dated Aug. 6, 2015, 5 pgs.
U.S. Appl. No. 13/729,392, Office Action dated Nov. 5, 2014, 14 pgs.
U.S. Appl. No. 13/729,424, Office Action dated Apr. 23, 2015, 30 pgs.
U.S. Appl. No. 13/729,647, Amendment and Response filed Jan. 23, 2015, 10 pgs.
U.S. Appl. No. 13/729,647, Notice of Allowance dated Mar. 16, 2015, 5 pgs.

(56) References Cited

OTHER PUBLICATIONS

U.S. Appl. No. 13/729,647, Notice of Allowance dated May 8, 2015, 5 pgs.
U.S. Appl. No. 13/729,647, Office Action dated Oct. 23, 2014, 11 pgs.
Vangorp, et al., "Perception of Visual Artifacts in Image-Based Rendering of Facades", Retrieved at <<http://www-sop.inria.fr/reves/Basilic/2011/VCLFD11 /VCLFD11-paper.pdf>>, Eurographics Symposium on Rendering, vol. 30, No. 4, Jun. 27, 2011, pp. 10.
Vazquez, et al., "Automatic View Selection Using Viewpoint Entropy and its Application to Image-Based Modelling", Retrieved at <<http://www.cs.ubc.ca/-heidrich/Papers/Forum.03.pdf>>, In Computer Graphics Forum, 22(4), Mar. 2003, pp. 11.
Vazquez, et al., "On the fly best view detection using graphics hardware", Retrieved at <<http://www.isi.upc.edu/3~ppau/filesWeb/ontheflyVIIP2004.pdf>>, Proceedings of the Fourth IASTED International Conference on Visualization, Imaging, and Image Processing, Sep. 6, 2004, pp. 6.
Why Hardware Tessellation is Awesome, Nov. 6, 2012, reprinted from the Internet at: http://www.nerdparadise.com/tech/graphics/hardwaretessellation/, 3 pgs.
U.S. Appl. No. 13/729,424, Amendment and Response filed Sep. 16, 2015, 27 pgs.
U.S. Appl. No. 13/729,424, Office Action dated Jan. 14, 2016, 35 pgs.
Turk, Greg, and Marc Levoy, "Zippered polygon meshes from range images", Proceedings of the 21st annual conference on Computer graphics and interactive techniques. ACM, Jul. 24-29, 1994, 8 pgs.
U.S. Appl. No. 14/818,508, Office Action dated May 13, 2016, 10 pgs.
U.S. Appl. No. 14/818,508, Office Action dated Oct. 19, 2016, 13 pgs.
U.S. Appl. No. 14/818,508, Amendment and Response filed Apr. 18, 2017, 18 pgs.
Chinese Office Action and Search Report in Application No. 201380068417.5, dated Jun. 29, 2017, 15 pages.
Guo He et al., "Integrated multi-view stereo matching system with arbitrary viewpoints", Computer Engineering and Design, vol. 28, No. 2, Jun. 30, 2007, 5 pages.
U.S. Appl. No. 14/818,508, USPTO Response dated Jun. 14, 2017, 2 pgs.
U.S. Appl. No. 14/818,508, Notice of Allowance dated Oct. 12, 2017, 2 pgs.

\* cited by examiner

REDUNDANT PIXEL MITIGATION

CROSS-REFERENCE TO RELATED APPLICATIONS

This application is a Continuation of, and claims priority to, prior non-provisional patent application Ser. No. 13/729,392, filed on Dec. 28, 2012, now U.S. Pat. No. 9,214,138, issued on Dec. 15, 2015, which application is incorporated herein by reference in its entirety.

BACKGROUND

Many users may interact with image data, such as a multidimensional image, generated by a rendering technique. In an example, geometry, such as a digital surface model, may represent a three-dimensional surface of a scene (e.g., a scene depicting a city). Initially, the geometry may comprise one or more non-textured pixels (e.g., a pixel with a depth value, but not a color value). Accordingly, one or more texture images may be used to texture the geometry to create textured geometry (e.g., color values may be assigned to pixels within the geometry based upon one or more texture images). In this way, the scene may be rendered based upon the textured geometry.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for mitigating redundant pixel contribution for texturing a geometry are provided herein. That is, a geometry may comprise a multi-dimensional representation of a scene. It may be appreciated that the scene may illustrate a person, a city, a location, a business, a house, a digitally rendered video game character, grass, water, etc. Initially, pixels within the geometry may comprise depth values, but may not comprise texture values, such as color values. Accordingly, the geometry may be textured using one or more texture images that depict the scene from various view directions. It may be appreciated that more than one texture image may contribute a texture value for a pixel within the geometry (e.g., a first photo of a highway from a northern viewpoint may depict a portion of a construction barrel and a second photo of the highway from a northeastern viewpoint may depict that same portion of the construction barrel). In this way, redundant pixel texture contribution may occur, which may result in inefficient data storage and/or inefficient bandwidth utilization during streaming due to using redundant data for texturing (e.g., an image based service, such as a mapping service, may stream multiple texture images to a client map application for use in texturing a geometry, which may result in transmission of redundant texture information).

As provided herein, redundant pixel texture contribution for texturing a geometry may be mitigated. In an example, a geometry may represent a three-dimensional surface of a scene, such as a scene depicting a city. A first texture image depicting the scene from a first view direction (e.g. a top-down view of the city), a second texture image depicting the scene from a second view direction (e.g., an oblique view of the city), and/or other texture images may be used to texture (e.g., assign color values to) pixels within the geometry. For example, the first texture image may be applied to the geometry to identify a first pixel texture contribution by the first texture image to the geometry (e.g., an identification of pixels within the geometry that are textured by the first texture image). The first pixel texture contribution may identify a textured geometry pixel within the geometry that is textured by the first texture image. In this way, texture contribution for the geometry by the first texture image may be identified (e.g., an identification of pixels within the geometry that can be assigned texture values by the first texture image).

The second texture image may provide redundant pixel texture contribution for one or more pixels, of the geometry, that are already textured by the first texture image. For example, the second texture image may provide a redundant textured pixel that textures a pixel within the geometry that is already textured by the first texture image. Because the textured geometry pixel is already textured by the first texture image, the redundant textured pixel may be knocked out from the second texture image to generate a modified second texture image. For example, the redundant textured pixel may be in-painted (e.g., assigned a color that may be efficient for compression, such as a color that blends the redundant textured pixel with other pixels). In this way, the modified second texture image may be efficiently compressed to mitigate storage resources and/or bandwidth used to store and/or stream the modified second texture image (e.g., compressed) to a client for texturing of the geometry by the client.

It is to be appreciated that in an example, a pixel, as used herein, may comprise one or more pixels, and is not limited to a single pixel. In an example, a pixel may comprise an arbitrarily sized superpixel. For example, the superpixel may correspond to an 8×8 block of pixels (e.g., a jpg block of pixels used during compression). In this way, a redundant superpixel may be knocked out from a texture image, which may improve compression (e.g., knocking out the 8×8 block of pixels as opposed to merely a single pixel (e.g., where knocking out multiple pixels may further promote compression)).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

Figure 1:
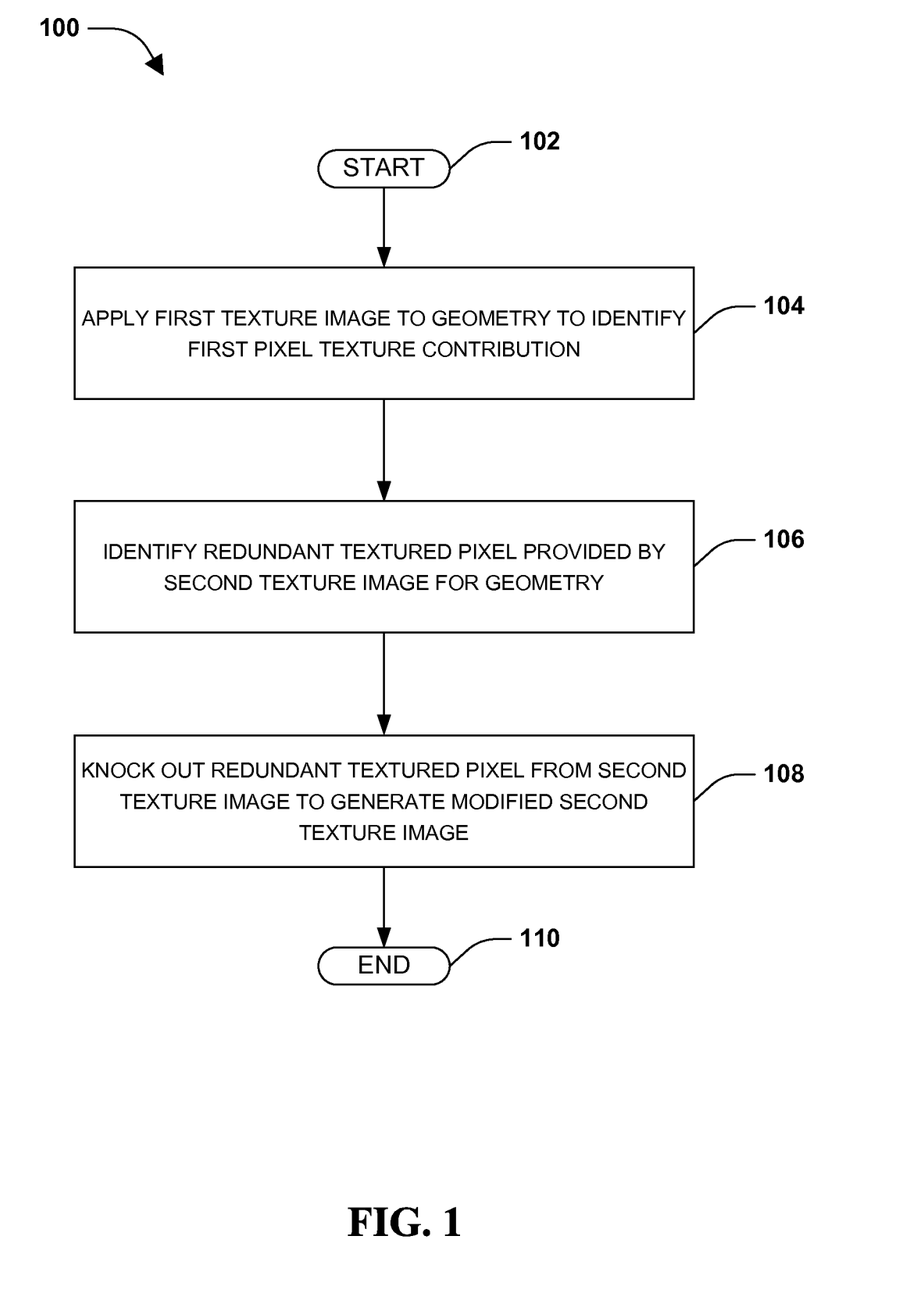
FIG. 1 is a flow diagram illustrating an exemplary method of mitigating redundant pixel texture contribution for texturing a geometry.

An embodiment of mitigating redundant pixel texture contribution for texturing a geometry is illustrated by an exemplary method 100 of FIG. 1. In an example, the geometry may represent a three-dimensional surface of a scene (e.g., a scene depicting a portion of a city). The geometry may comprise one or more pixels having depth values (e.g., at times referred to as 3D points). The geometry may be textured using one or more texture images. For example, an RGB texture image may comprise one or more pixels having color values and/or depths values (e.g., at times referred to as locations). A 3D point of the geometry may be projected to a location within the RGB texture image during texturing based upon the 3D point and the location having similar depth values. A color value at the location may be assigned to the pixel of the geometry, thus texturing the pixel to generate a textured geometry pixel. It may be appreciated that the geometry may be textured using more than one texture image, which may result in redundant pixel texture contribution (e.g., a first location within a first texture image and a second location within a second texture image may both provide color values for a pixel within the geometry), such that texture imagery may not be efficiently stored and/or streamed to a client due to redundant data.

Accordingly, a first texture image may be applied to the geometry to identify a first pixel texture contribution by the first texture image to the geometry, at 104. The first texture image may depict the scene, represented by the geometry, according to a first view direction (e.g., the first texture image may comprise a NADIR image and the first view direction may comprise a plumb line view direction of the scene, such as a top-down view of the city). The first pixel texture contribution may identify a textured geometry pixel within the geometry that is textured by the first texture image. In an example, a first 3D point associated with a first pixel of the geometry may be projected to a first location within the first texture image. First texture information associated with the first location (e.g., a color value of the first location) may be identified as contributing to the first pixel. Responsive to a depth of the first pixel corresponding to a depth of the first location, the first texture information may be included within the first pixel textured contribution (e.g., the color value and/or an indication that the first location contributed to texturing of the first pixel). In this way, the first pixel texture contribution may identify that the first pixel was textured (e.g., thus generating the textured geometry pixel) by the first texture imagery (e.g., the first pixel was textured by a color value associated with the first location).

At 106, a redundant textured pixel provided by a second texture image for the geometry may be identified based upon the redundant textured pixel corresponding to the textured geometry pixel (e.g., the first pixel within the geometry that was already textured by the first texture imagery). The second texture image may depict the scene, represented by the geometry, according to a second view direction (e.g., the second texture image may depict the city from a substantially oblique view direction). In an example, the first 3D point associated with the first pixel of the geometry may be projected to a second location within the second texture image. Second texture information associated with the second location (e.g., a color value of the second location) may be identified as contributing to the first pixel. Responsive to the depth of the first pixel corresponding to a depth of the second location, the second texture information may be included within a second pixel texture contribution (e.g., the color value and/or an indication that the second location contributed to texturing of the first pixel). In this way, the second pixel texture contribution may identify that the first pixel was textured (e.g., the textured geometry pixel) by the second texture image (e.g., the first pixel was textured by a color value associated with the second location). In an example of determining the redundant textured pixel, the first pixel texture contribution and the second pixel texture contribution may be evaluated to determine that the first texture image and the second texture image both contributed to texturing the first pixel, thus creating a redundant pixel texture contribution. That is, the redundant textured pixel may be identified as the second location within the second texture image because the second location contributed to the first pixel of the geometry that was already contributed to by the first location within the first texture image.

At 108, the redundant textured pixel (e.g., the second location) may be knocked out from the second texture image to generate a modified second texture image. It may be appreciated that a variety of image modification techniques may be used to knock out the redundant textured pixel. In an example, the redundant textured pixel may be in-painted, which may assign a color value to the redundant textured pixel that may result in efficient compression of the redundant textured pixel. In another example, an occlusion metric (e.g., whether the first pixel is occluded within the first and/or second texture image), a viewing direction metric (e.g., whether a viewing direction of the scene by the first texture image or second texture image is more desirable), a surface normal metric (e.g., whether the first texture image and/or the second texture image depict a surface of the scene from a perpendicular view), and/or a variety of other image modification techniques and/or metrics may be used to generate the modified second texture image. In this way, one or more redundant textured pixels may be knocked out from the second texture image to generate the modified second texture image, which may be efficiently compressed for storage and/or streaming to a client.

In an example, the modified second texture image may be compressed to generate a compressed second texture image. The first texture image, the compressed second texture image (e.g., or the modified second texture image in an uncompressed format), and/or the geometry may be streamed to a client for texturing of the geometry by the client during rendering of the scene represented by the geometry. For example, an image based service may preprocess the second texture image to generate the modified second texture image, which may be optionally stored as the compressed second texture image. In this way, the image based service may stream the texture imagery and/or the geometry to a client, such as a client mapping application, that may texture the geometry using the texture imagery.

In an example, multiple texture images, such as a third texture image depicting the scene from a third view direction, may be used to texture the geometry. Accordingly, redundant pixel texture contribution by the third texture image and/or other texture images may be mitigated. For example, a second redundant textured pixel provided by the third texture image for the geometry may be identified based upon the second redundant textured pixel corresponding to one or more textured geometry pixels within the first pixel texture contribution (e.g., and/or within a second pixel textured contribution). In this way, the second redundant textured pixel may be knocked out from the third texture image to generate a modified third texture image. In an example, redundant textured pixel contribution may be blended during texturing (e.g., as opposed to being knocked out). For example, a pixel texture contribution overlap may be identified between the modified second texture image and the modified third texture image (e.g., the modified second and third texture images may depict a side of a building from slightly different oblique view directions). In this way, the modified second texture image and the modified third texture image may be streamed to a client for blended texturing of at least a portion of the geometry by the client based upon the pixel texture contribution overlap. For example, the side of the building may be textured based upon a blend (e.g., a temporal blending technique, a view blending technique, etc.) of pixel textured contribution by the modified second texture image and the modified third texture image. At 110, the method ends.

Figure 2:
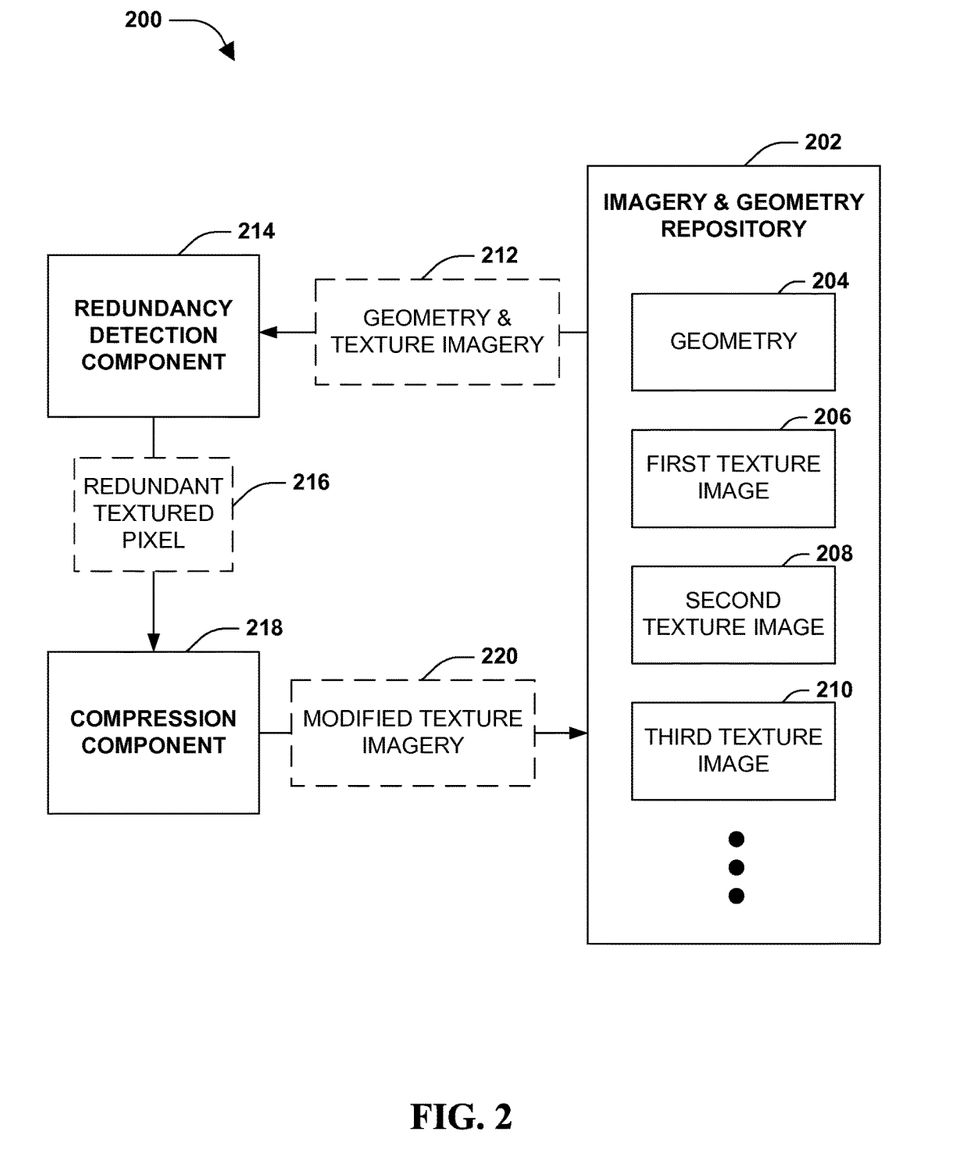
FIG. 2 is a component block diagram illustrating an exemplary system for mitigating redundant pixel texture contribution for texturing a geometry.

FIG. 2 illustrates an example of a system 200 configured for mitigating redundant pixel texture contribution for texturing a geometry 204. The system 200 may comprise a redundancy detection component 214 and/or a compression component 218. The system 200 may be associated with an image and geometry repository (repository 202). The repository 202 may comprise the geometry 204 representing a surface of a scene (e.g., a three-dimensional digital surface model of a city that may have been generated based upon one or more depth images depicting the city). The repository 202 may comprise one or more texture images depicting the scene from various view directions (e.g., an image comprising color values and/or depths values for pixels, collectively referred to as locations). For example, a first texture image 206 may comprise a nadir image that depicts a top-down view of the city, a second texture image 208 may comprise a northern facing oblique view of the city, a third texture image 210 may comprise a northeastern facing oblique view of the city, etc. In this way, the one or more texture images may be used to texture the geometry 204 (e.g., assign color values to pixels).

The redundancy detection component 214 may be configured to detect one or more redundant textured pixels (e.g., redundant textured pixel 216) that provide overlapping texture contribution to the geometry 204. For example, the redundancy detection component 214 may obtain 212 the geometry 204 and/or texture imagery, such as the first texture image 206 and the second texture image 208. The redundancy detection component 214 may apply the first texture image 206 to the geometry 204 to identify a first pixel texture contribution for the first texture image 206 to the geometry 204. The first pixel texture contribution may identify a textured geometry pixel within the geometry 204 that is textured by the first texture image 206 (e.g., the textured geometry pixel and a first location within the first texture image 206 may have relatively similar depth values, such that a color value of the first location may be used to texture the textured geometry pixel within the geometry 204). The redundancy detection component 214 may identify the redundant textured pixel 216 provided by the second texture image 208 for the geometry 204 based upon the redundant textured pixel 216 corresponding to the textured geometry pixel (e.g., the textured geometry pixel and a second location within the second texture image 208 may have relatively similar depth values, such that a color value of the second location may be used to texture the textured geometry pixel within the geometry 204). Because the first location within the first texture image 206 and the second location within the second texture image 208 both contribute to texturing the textured geometry pixel, the second location may be identified as the redundant textured pixel 216.

The compression component 218 may be configured to modify 220 texture imagery so that storage and/or streaming bandwidth may be improved. In an example, the compression component 218 may knockout the redundant textured pixel 216 from the second texture image 208 (e.g., by an in-painting technique) to generate a modified second texture image that may be efficiently compressed. In another example, the compression component 218 may compress the modified second texture image to generate a compressed second texture image. In this way, the compressed second texture image may be efficiently stored within the repository 202 and/or streamed to a client for texturing of the geometry 204 (e.g., FIG. 5).

Figure 3:
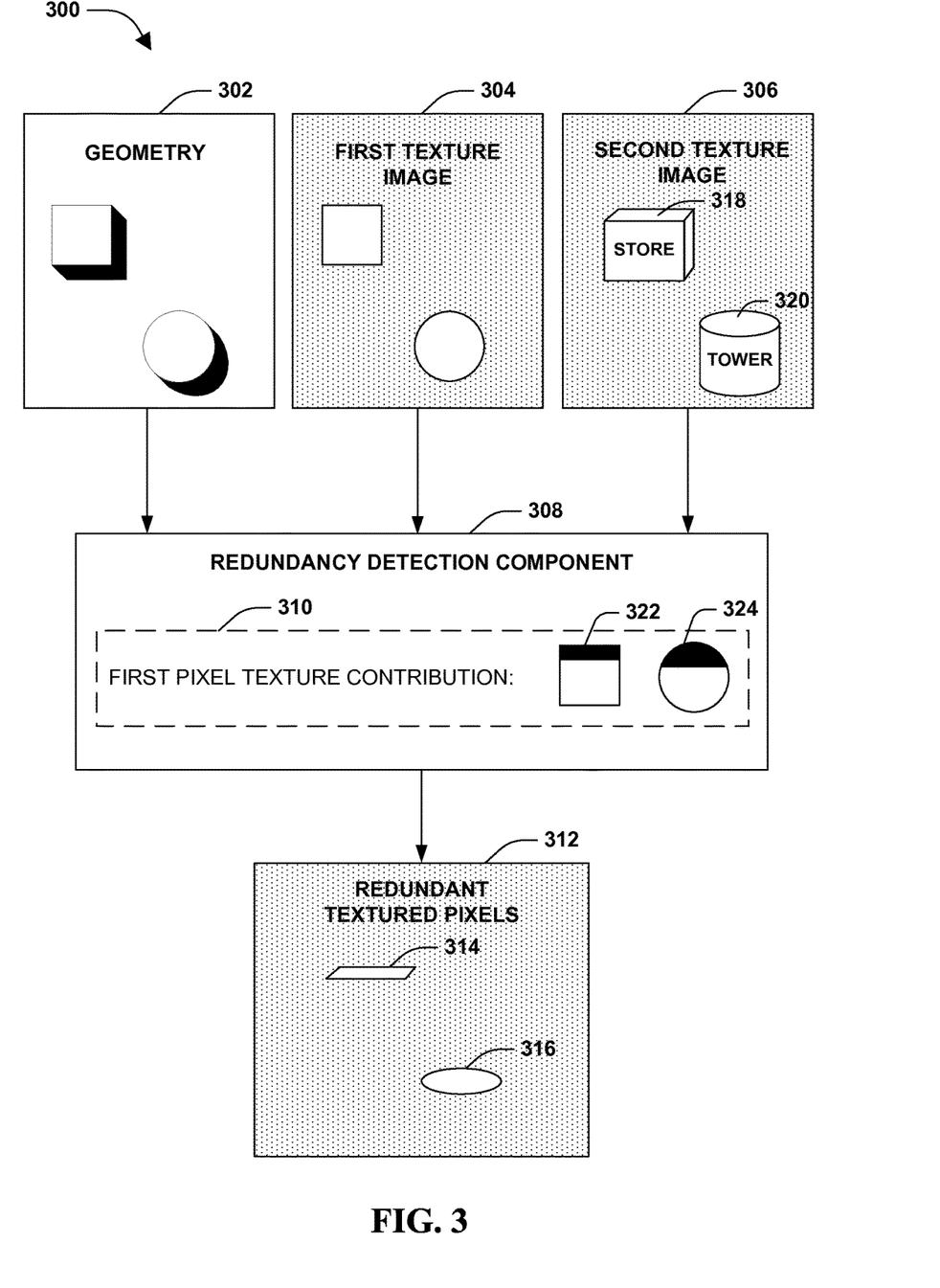
FIG. 3 is a component block diagram illustrating an exemplary system for identifying one or more redundant textured pixels.

FIG. 3 illustrates an example of a system 300 configured for identifying one or more redundant textured pixels 312. The system 300 may comprise a redundancy detection component 308. The redundancy detection component 308 may be configured to identify a first pixel texture contribution 310 by a first texture image 304 to one or more pixels of a geometry 302 and/or a second pixel texture contribution by a second texture image 306 to one or more pixels of the geometry 302, which may be used to identify one or redundant textured pixels 312 (e.g., overlapping pixel texture contributions by the first texture image 304 and the second texture image 306).

In an example, the geometry 302 may represent a three-dimensional surface of a scene, such as a city comprising a store and a tower. The first texture image 304 may depict the city from a top-down view direction. For example, the first texture image 304 may depict a square rooftop of the store and a circular rooftop of the tower. The second texture image 306 may depict the city from an oblique view direction. For example, the second texture image 306 may depict a portion 318 of the square rooftop of the store, a northern façade of the store (e.g., the northern façade may comprise a sign "STORE"), and an eastern façade of the store. The second texture image 306 may depict a portion 320 of the circular rooftop of the tower, and a northeastern façade of the tower (e.g., the northeastern façade may comprise a sign "TOWER"). The first texture image 304 and the second texture image 306 may be used to texture the geometry 302 (e.g., color values within the first and/or second texture images may be assigned to corresponding pixels within the geometry). However, one or more pixels within the geometry 302 may be textured by locations within both the first texture image 304 and the second texture image 306, which may result in redundant pixel texture contribution (e.g., the 318 portion of the square rooftop of the store and/or the 320 portion of the circular rooftop of the tower may be textured by both the first texture image 304 and the second texture image 306).

In an example, the redundancy detection component 308 may be configured to apply the first texture image 304 to the geometry 302 to identify the first pixel texture contribution 310. For example, locations within the first texture image 304 may provide color values for the square rooftop of the store and/or the circular rooftop of the tower. The redundancy detection component 308 may identify one or more redundant texture pixels 312 provided by the second texture image 306 (e.g., a first redundant contribution 314 for the portion 318 of the square rooftop provided by the second texture image 306 and/or a second redundant contribution 316 for the portion 320 of the circular rooftop provided by the second texture image 306). For example, the second texture image 306 may provide color values for the portion 318 of the square rooftop and the portion 320 of the circular rooftop, which may redundantly texture the geometry 302 because such portions may also be textured by the square rooftop and the circular rooftop depicted by the first texture image 304 (e.g., by at least a portion of the first pixel texture contribution 310, such as a first contribution 322 for the square rooftop and/or a second contribution 324 for the circular rooftop). In this way, the redundancy detection component 308 may identify the redundant textured pixels 312 comprising the first redundant contribution 314 and the second redundant contribution 316 provided by the portions 318 and 320 of the second texture image 306.

Figure 4:
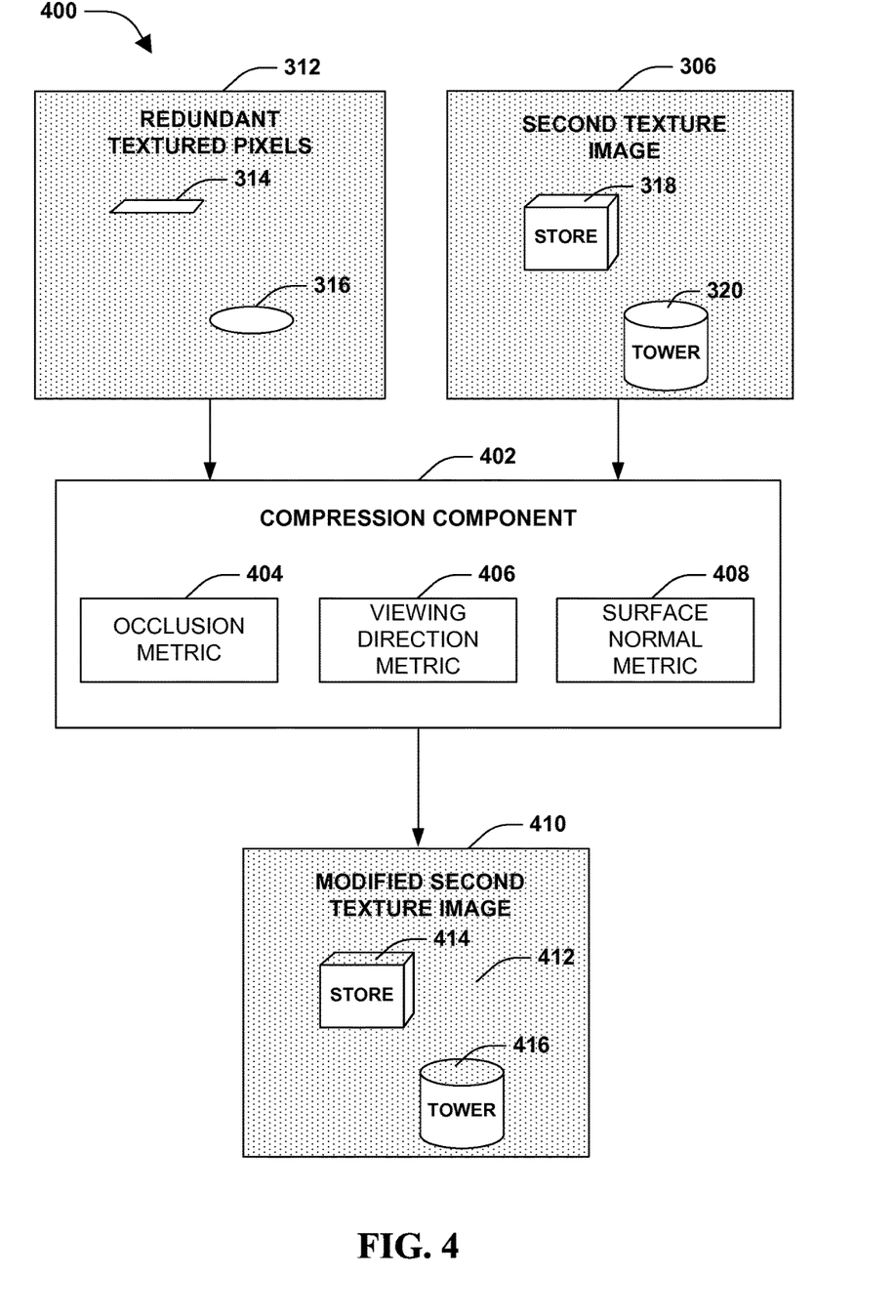
FIG. 4 is a component block diagram illustrating an exemplary system for knocking out a redundant textured pixel to generate a modified texture image.

FIG. 4 illustrates an example of a system 400 configured for knocking out one or more redundant textured pixels 312 from a second texture image 306 to generate a modified second texture image 410. In an example, the redundant textured pixels 312 of the second texture image 306 may have been identified by a redundancy detection component 308 of FIG. 3. For example, a first redundant contribution 314 may correspond to a portion 318 of a square rooftop depicted by the second texture image 306, which may have been identified as redundantly texturing corresponding pixels within a geometry in light of a first texture image also texturing such pixels (e.g., a first contribution 322 by first texture image 304 of FIG. 3). The second redundant contribution 316 may correspond to a portion 320 of a circular rooftop depicted by the second texture image 306, which may have been identified as redundantly texturing corresponding pixels within the geometry in light of the first texture image also texturing such pixels (e.g., second contribution 324 by the first texture image 304 of FIG. 3).

The compression component 402 may be configured to knockout (e.g., in-paint) one or more redundant textured pixels, such as pixels within the second texture image 306 corresponding to the first redundant contribution 314 (e.g., pixels depicting the portion 318 of the square rooftop) and/or the second redundant contribution 316 (e.g., pixels depicting the portion 320 of the circular rooftop). In an example, the compression component 402 may take into account occlusion (e.g., occlusion metric 404 relating to visibility of a redundant textured pixel), a viewing direction (e.g., a viewing direction metric 406 taking into account a desired view of a scene depicted by geometry that is to be textured by the second texture image 306), and/or a surface normal (e.g., a surface normal metric 408 identifying whether a pixel texture contribution is provided along a view direction that is tangential to a surface of the scene depicted by the geometry).

In an example of knocking out one or more redundant textured pixels, the compression component 402 may in-paint 414 pixels, depicting the portion 318 of the square rooftop, a texture value (e.g., a color value) that is substantially similar to surrounding pixels (e.g., background pixels 412) of the second texture image. The compression component 402 may in-paint 416 pixels, depicting the portion 320 of the circular rooftop, a texture value (e.g., a color value) that is substantially similar to surrounding pixels (e.g., background pixels 412). In this way, the compression component 402 may generate the modified second texture image 410, which may be efficiently compressed for storage and/or streaming to a client for client-side texturing and/or rendering of the geometry.

Figure 5:
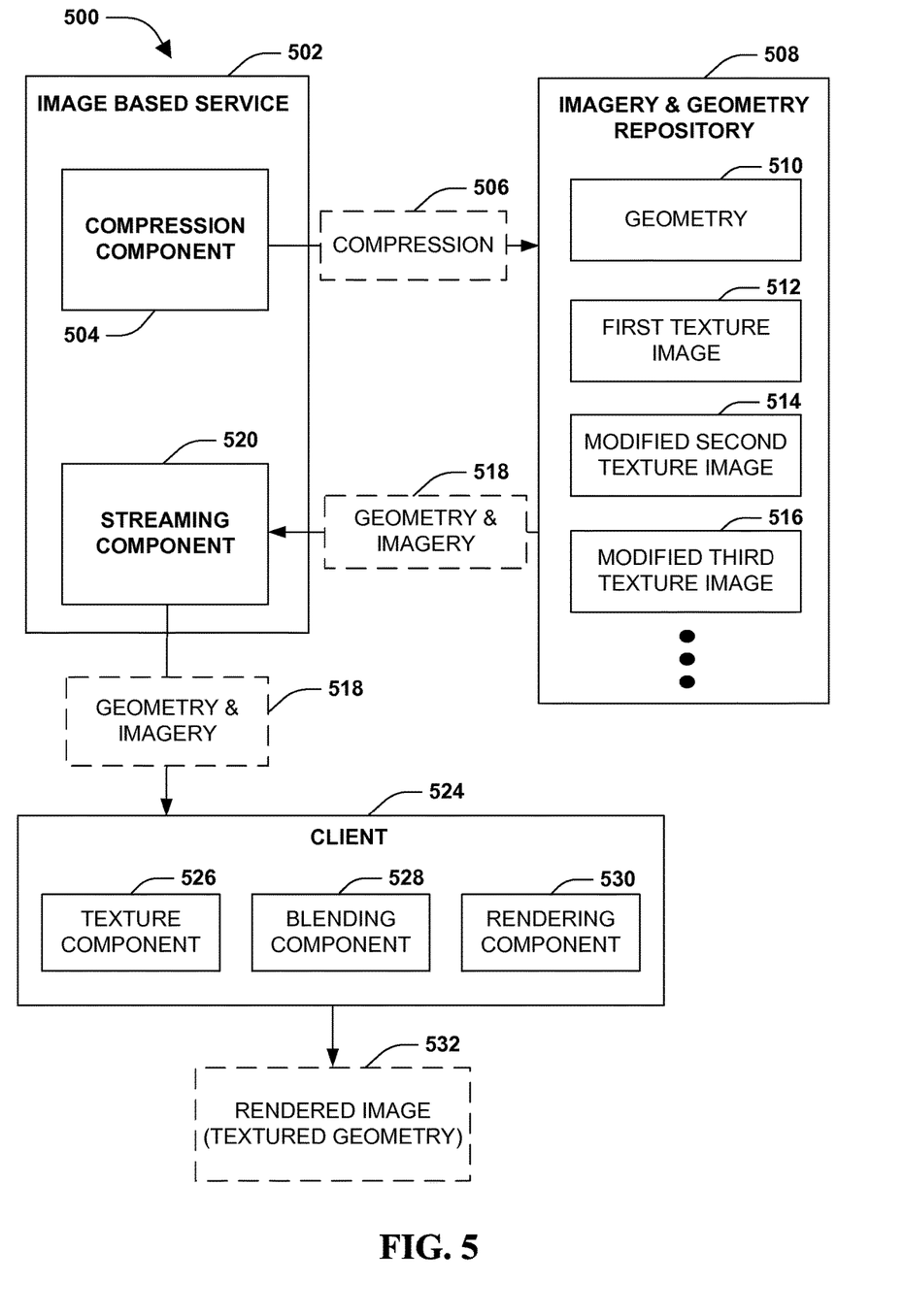
FIG. 5 is a component block diagram illustrating an exemplary system for streaming a modified texture image to a client for use in texturing a geometry.

FIG. 5 illustrates an example of a system 500 configured for streaming modified texture imagery to a client 524 for use in texturing a geometry 510. The system 500 may be associated with an image based service 502 (e.g., a mapping service, a photo sharing service, a video streaming service, a social network, a search engine, a website, etc.). The image based service 502 may be configured to stream image data 518 to the client 524 so that the client 524 can texture the geometry 510 using one or more texture images.

The system 500 may comprise a compression component 504 and/or a streaming component 520. The compression component 502 may be configured to compress 506 one or more texture images stored within a repository 508. In an example, the repository 508 may comprise the geometry 510 representing a three-dimensional surface of a scene, such as an outdoor location. The repository 508 may comprise a first texture image 512 depicting the outdoor location from a top-down point of view, a modified second texture image 514 depicting the outdoor location from a first oblique view (e.g., a second texture image comprising one or more in-painted portions that may have overlapped with the first texture image 512), a modified third texture image 516 depicting the outdoor location from a second oblique view (e.g., a third texture image comprising one or more in-painted portions that may have overlapped with the first texture image 512), and/or other texture images. In an example, the compression component 504 may compress 506 one or more of the texture images, such as the modified second texture image 514 and/or the modified third texture images 516 because the in-painted portions of such texture images may result in efficient compression.

The streaming component 520 may be configured to obtain image data 518, such as the geometry 510, the first texture image 512, the modified second texture image 514, the modified third texture image 516, etc. For example, the image data 518 may be obtained based upon a request from the client 524 (e.g., a client mapping application may request the image data corresponding to the outdoor location so that the client mapping application may texture and/or render the outdoor location). In this way, the streaming component 520 may stream the image data 518 to the client 524. A texture component 526 may texture the geometry 510 using the first texture image 512, the modified second texture image 514, and/or the modified third texture image 516. A blending component 528 may blend overlapping contributions between modified texture images (e.g., the modified second texture image 514 and the modified third texture image 516 may both contribute texture values for a façade of a building). A rendering component 530 may render the textured geometry as a rendered image 532.

Figure 6:
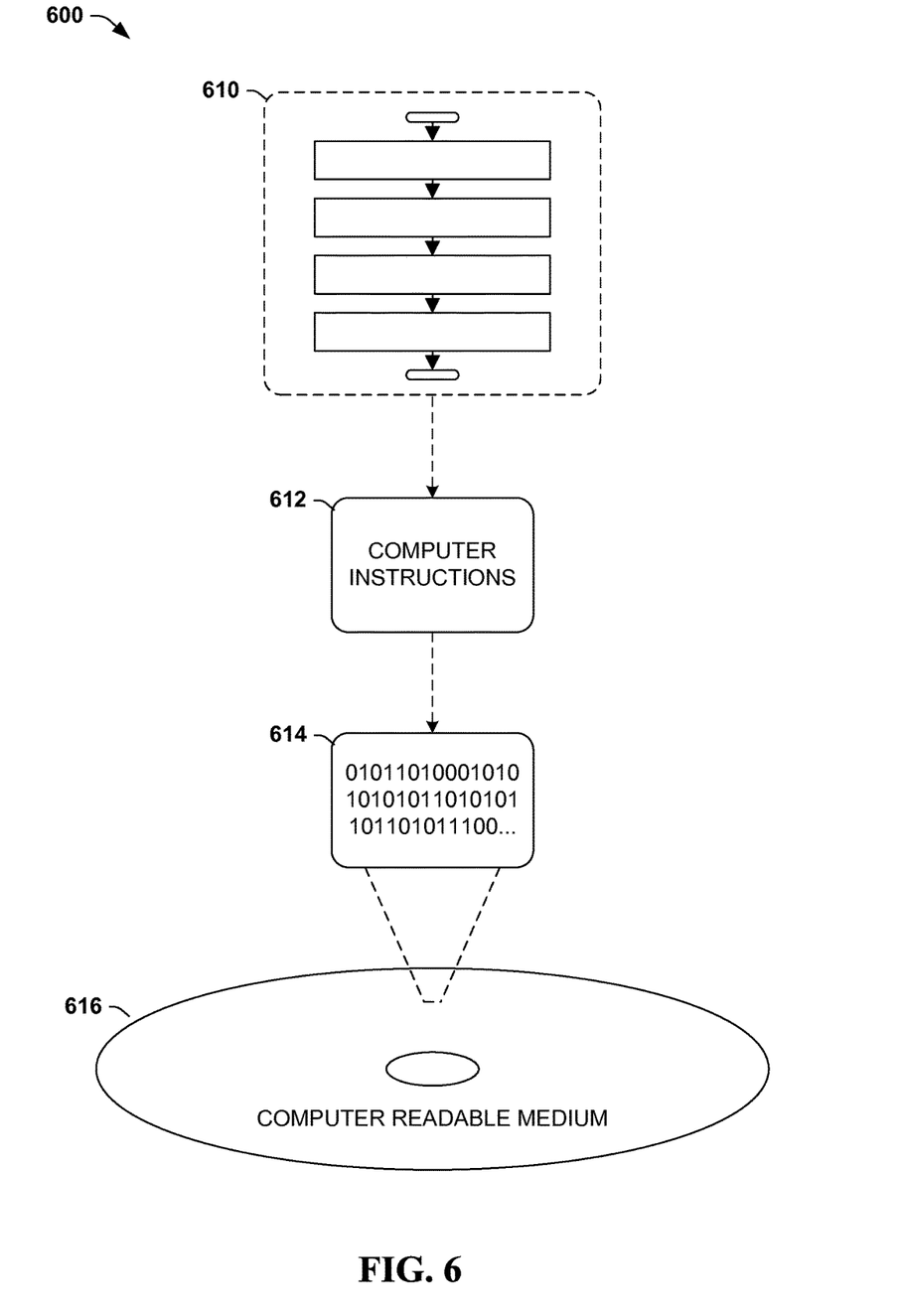
FIG. 6 is an illustration of an exemplary computing device-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 6, wherein the implementation 600 comprises a computer-readable medium 616 (e.g., a CD-R, DVD-R, or a platter of a hard disk drive), on which is encoded computer-readable data 614. This computer-readable data 614 in turn comprises a set of computer instructions 612 configured to operate according to one or more of the principles set forth herein. In one such embodiment 600, the processor-executable computer instructions 612 may be configured to perform a method 610, such as at least some of the exemplary method 100 of FIG. 1, for example. In another such embodiment, the processor-executable instructions 612 may be configured to implement a system, such as at least some of the exemplary system 200 of FIG. 2, least some of the exemplary system 300 of FIG. 3, least some of the exemplary system 400 of FIG. 4, and/or at least some of the exemplary system 500 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 7:
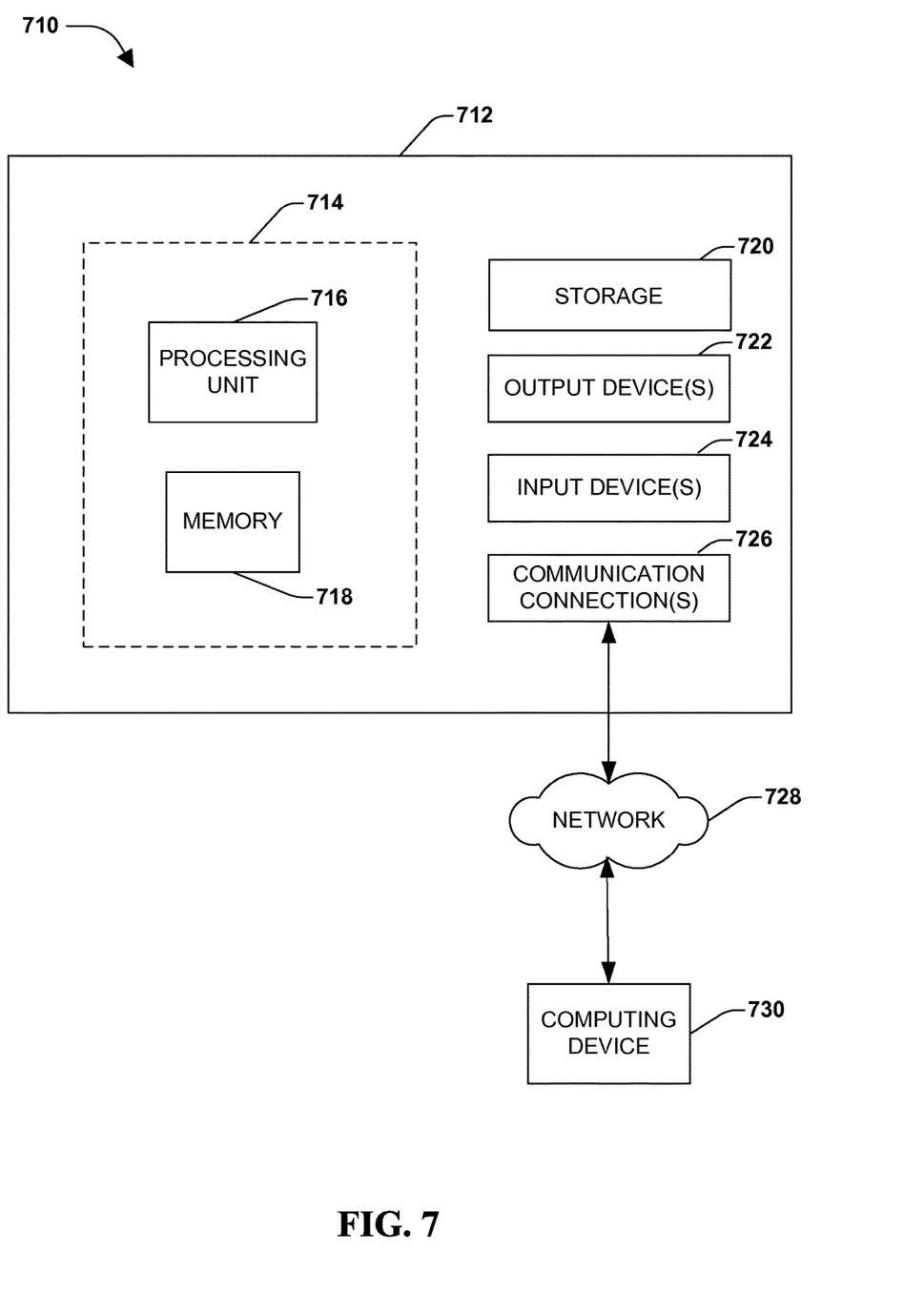
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only an example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 710 comprising a computing device 712 configured to implement one or more embodiments provided herein. In one configuration, computing device 712 includes at least one processing unit 716 and memory 718. Depending on the exact configuration and type of computing device, memory 718 may be volatile (such as RAM, for example), non-volatile (such as ROM, flash memory, etc., for example) or some combination of the two. This configuration is illustrated in FIG. 7 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 7 by storage 720. In an embodiment, computer readable instructions to implement one or more embodiments provided herein may be in storage 720. Storage 720 may also store other computer readable instructions to implement an operating system, an application program, and the like. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Any such computer storage media may be part of device 712.

Device 712 may also include communication connection(s) 726 that allows device 712 to communicate with other devices. Communication connection(s) 726 may include, but is not limited to, a modem, a Network Interface Card (NIC), an integrated network interface, a radio frequency transmitter/receiver, an infrared port, a USB connection, or other interfaces for connecting computing device 712 to other computing devices. Communication connection(s) 726 may include a wired connection or a wireless connection. Communication connection(s) 726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device(s) 724 such as keyboard, mouse, pen, voice input device, touch input device, infrared cameras, video input devices, and/or any other input device. Output device(s) 722 such as one or more displays, speakers, printers, and/or any other output device may also be included in device 712. Input device(s) 724 and output device(s) 722 may be connected to device 712 via a wired connection, wireless connection, or any combination thereof. In an embodiment, an input device or an output device from another computing device may be used as input device(s) 724 or output device(s) 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 712 may be interconnected by a network. For example, memory 718 may be comprised of multiple physical memory units located in different physical locations interconnected by a network.

Those skilled in the art will realize that storage devices utilized to store computer readable instructions may be distributed across a network. For example, a computing device 730 accessible via a network 728 may store computer readable instructions to implement one or more embodiments provided herein. Computing device 712 may access computing device 730 and download a part or all of the computer readable instructions for execution. Alternatively, computing device 712 may download pieces of the computer readable instructions, as needed, or some instructions may be executed at computing device 712 and some at computing device 730.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer system comprising a computer-readable storage device operatively coupled to at least one processor, the computer readable storage device storing instructions that when executed perform the method, the method comprising:
   identifying, along a first view direction, a geometry to generate a first projected geometric view;
   identifying a first pixel texture contribution of a first texture image, the first texture image being applied to the first projected geometric view;
   identifying, along a second view direction, a geometry to generate a second projected geometric view;
   identifying a redundant textured pixel provided by a second texture image, the second texture image being applied to the second geometric view;
   identifying a remainder of the textured pixels by removing the redundant textured pixels from the first pixel texture contribution; and
   generating, using the at least one processor, a modified second texture image using at least a portion of the remainder textured pixels.

2. The system of claim 1, further comprising:
   in-painting the redundant textured pixel within the second texture image to generate the modified second texture image.

3. The system of claim 1, further comprising:
   compressing the second texture image to generate the pre-processed second texture image.

4. The system of claim 1, further comprising:
   streaming the geometry, the first texture image, and the pre-processed second texture image to a client during rendering of a scene represented, in part, by the geometry.

5. The system of claim 1, wherein the first view direction comprises a plumb line view direction and the second view direction comprises a substantially oblique view direction.

6. The system of claim 1, wherein the geometry depicts in part a scene, the scene comprising an aerial view of at least a portion of a city, and the redundant textured pixel corresponding to a flat portion of the city depicted by a top-down view of the city represented by the first view direction of the first texture image.

7. The system of claim 1, the redundant textured pixel comprising a superpixel corresponding to more than one pixel.

8. A computer readable-storage device storing instructions that when executed cause a processor to execute a method, the method comprising:
- identifying, along a first view direction, a geometry to generate a first projected geometric view;
- identifying a first pixel texture contribution of a first texture image, the first texture image being applied to the first projected geometric view;
- identifying, along a second view direction, a geometry to generate a second projected geometric view;
- identifying a redundant textured pixel provided by a second texture image, the second texture image being applied to the second geometric view;
- identifying a remainder of the textured pixels by removing the redundant textured pixels from the first pixel texture contribution;
- generating a modified second texture image using at least a portion of the remainder textured pixels;
- storing the modified second texture image in computer readable storage media.

9. The computer readable-storage device of claim 8, further comprising:
- in-painting the redundant textured pixel within the second texture image to generate the modified second texture image.

10. The computer readable-storage device of claim 8, further comprising:
- compressing the second texture image to generate the pre-processed second texture image.

11. The computer readable-storage device of claim 8, further comprising:
- streaming the geometry, the first texture image, and the pre-processed second texture image to a client during rendering of a scene represented, in part, by the geometry.

12. The computer readable-storage device of claim 8, wherein the first view direction comprises a plumb line view direction and the second view direction comprises a substantially oblique view direction.

13. The computer readable-storage device of claim 8, wherein the geometry depicts in part a scene, the scene comprising an aerial view of at least a portion of a city, and the redundant textured pixel corresponding to a flat portion of the city depicted by a top-down view of the city represented by the first view direction of the first texture image.

14. The computer readable-storage device of claim 8, the redundant textured pixel comprising a superpixel corresponding to more than one pixel.

15. A computer implemented method comprising:
- identifying, along a first view direction, a geometry to generate a first projected geometric view;
- identifying a first pixel texture contribution of a first texture image, the first texture image being applied to the first projected geometric view;
- identifying, along a second view direction, a geometry to generate a second projected geometric view;
- identifying a redundant textured pixel provided by a second texture image, the second texture image being applied to the second geometric view;
- identifying a remainder of the textured pixels by removing the redundant textured pixels from the first pixel texture contribution; and
- generating, by a computer processor, a modified second texture image using at least a portion of the remainder textured pixels.

16. The method of claim 15, further comprising:
in-painting the redundant textured pixel within the second texture image to generate the modified second texture image.

17. The method of claim 15, further comprising:
compressing the second texture image to generate the pre-processed second texture image.

18. The method of claim 15, further comprising:
streaming the geometry, the first texture image, and the pre-processed second texture image to a client during rendering of a scene represented, in part, by the geometry.

19. The method of claim 15, wherein the first view direction comprises a plumb line view direction and the second view direction comprises a substantially oblique view direction.

20. The method of claim 15, the redundant textured pixel comprising a superpixel corresponding to more than one pixel.

* * * * *